S. ZELAZO.
CHRISTMAS TREE STAND.
APPLICATION FILED JUNE 29, 1921.
1,421,340.
Patented June 27, 1922.
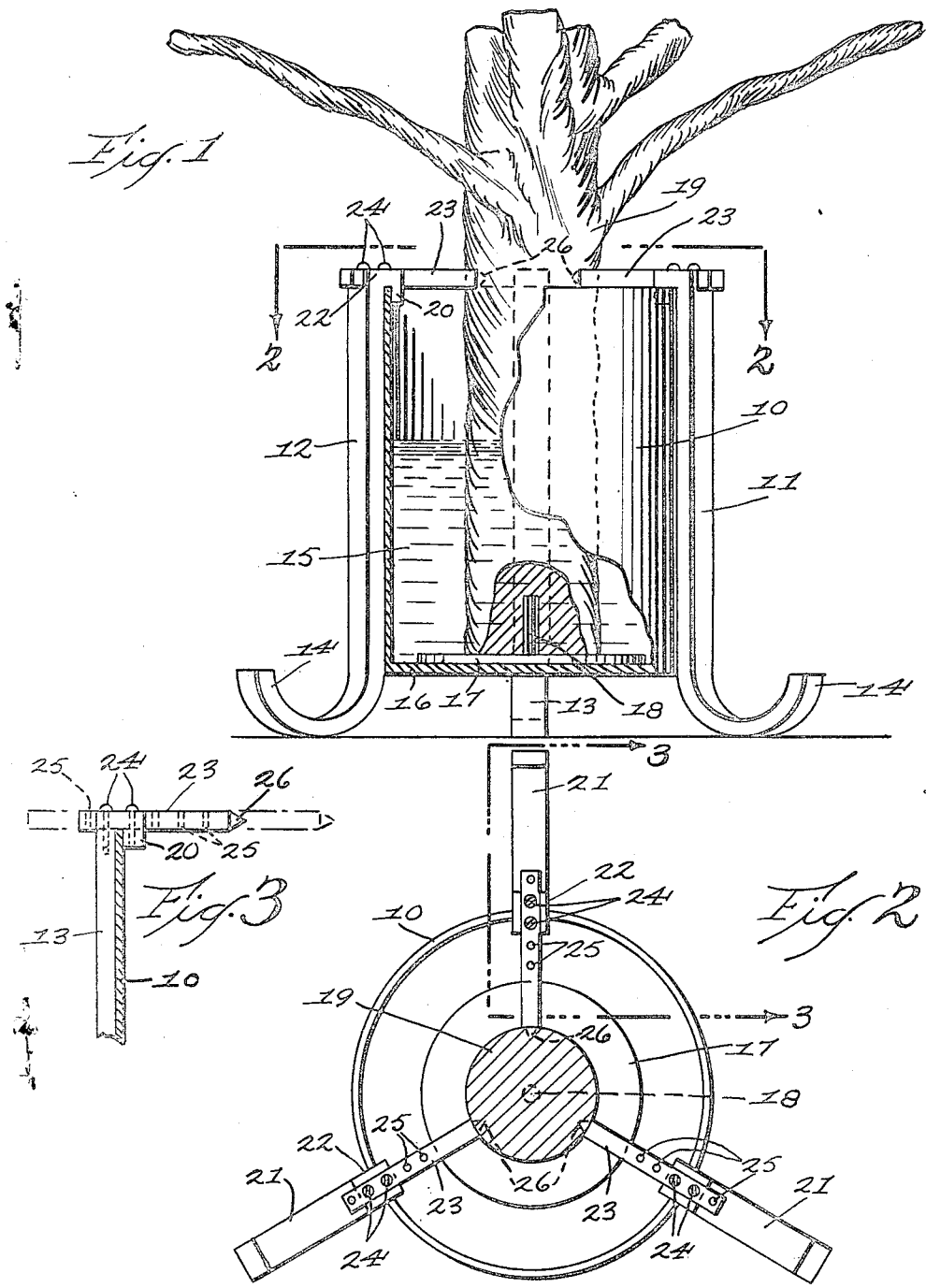
Inventor
Stanley Zelazo
By his Attorney
George C. Heinicke

UNITED STATES PATENT OFFICE.

STANLEY ZELAZO, OF ADAMS, MASSACHUSETTS.

CHRISTMAS-TREE STAND.

1,421,340. Specification of Letters Patent. Patented June 27, 1922.

Application filed June 29, 1921. Serial No. 481,235.

*To all whom it may concern:*

Be it known that I, STANLEY ZELAZO, a citizen of the United States of America, residing at Adams, county of Berkshire, and State of Massachusetts, have invented certain new and useful Improvements in Christmas-Tree Stands, of which the following is a specification.

This invention relates to improvements in tree stands, and particularly to improvements in stands serving as holders for Chistmas trees.

It is the principal object of the invention to provide a stand of this character which allows a ready attachment to or removal from any tree of any diameter or circumference.

A further object of the invention is the provision of a tree stand adapted to hold a certain quantity of water and having a tree engaging central member for securely holding the tree in the stand.

These and other like objects are attained by the novel construction and combination of parts hereinafter more fully described and set forth in the appended claim.

In the accompanying drawing forming a material part of this disclosure:

Figure 1 is a front elevation of a tree stand constructed according to the present invention, partly in section.

Figure 2 is a top plan view taken in the direction of line 2—2 of Figure 1, and

Figure 3 is a detail view of one of the adjustable holder arms partly in section along line 3—3 of Figure 2.

The Christmas tree stand comprises a vessel or receptacle 10 supported by legs 11, 12 and 13 having curved feet 14. This receptacle can be made of any suitable material and circular in cross section as illustrated in the drawing, or may have any other suitable form or shape and is adapted to contain water as indicated at 15, wet sand, or the like.

The bottom plate 16 is reinforced by a disc 17 or the like made integrally with the bottom and provided with a centrally arranged pin 18 adapted to engage in a bore or hole made in the tree 19 in the center thereof.

Flanges 20 on the upper ends of the legs grip over the upper marginal edge of the receptacle or container 10, and radial plates 21 are supported by said flanges 20 and secured thereto at the inner ends. Between upstanding flanges 22 at the inner ends of the plates 21, the outer ends of holder arms 23 are guided which can be adjusted and locked in their adjusted positions by means of pins, screws 24 or the like engaging holes 25 in said arms, the plates 21 and flanges 20 of the feet. These arms 23 have sharp points 26 at the inner ends adapted to be driven into the wood of the tree.

It will be clear that after a bore has been made in the lower end of the tree in the direction of its longitudinal central axis, it can be set upon the pin 18 whereupon the points 26 of the arms 23 are driven into the tree so that it will be held in exactly the center of the receptacle 10 and any deviations from the vertical center line may be easily corrected by the corresponding adjustment of the arms 23.

Changes may be made in the general arrangement of the stand and in the minor details of its construction without departing from the scope and spirit of the present invention.

What I claim as new, and desire to secure by Letters Patent of the United States is:

In a tree stand of the character described, a receptacle adapted to contain water, vertical legs having curved feet and flanges on the upper ends of said legs adapted to grip over the upper marginal edge of said receptacle for supporting said receptacle, a reinforcing plate secured to the bottom of said receptacle, a pin centrally arranged in said plate and adapted to engage a bore in the tree for holding and securing the lower end of the tree to the bottom of said receptacle, a plurality of radially arranged perforated plates supported by said flanges, upstanding flanges on said plates, a plurality of sharp pointed arms guided between the flanges on said plates and adapted to be secured in their relative adjusted positions to said plates by means of bolts passing through the perforation in said plates.

In testimony whereof I have affixed my signature.

STANLEY ZELAZO.